United States Patent
Van Phan et al.

(10) Patent No.: US 9,807,654 B2
(45) Date of Patent: Oct. 31, 2017

(54) MOBILITY IN HETEROGENEOUS NETWORK ENVIRONMENTS

(71) Applicant: Nokia Solutions and Networks Oy, Espoo (FI)

(72) Inventors: Vinh Van Phan, Oulu (FI); Ling Yu, Espoo (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/764,656

(22) PCT Filed: Feb. 8, 2013

(86) PCT No.: PCT/EP2013/052501
§ 371 (c)(1),
(2) Date: Jul. 30, 2015

(87) PCT Pub. No.: WO2014/121841
PCT Pub. Date: Aug. 14, 2014

(65) Prior Publication Data
US 2015/0382260 A1   Dec. 31, 2015

(51) Int. Cl.
| | | |
|---|---|---|
| H04W 36/04 | (2009.01) | |
| H04W 24/02 | (2009.01) | |
| H04W 36/00 | (2009.01) | |
| H04W 76/02 | (2009.01) | |
| H04W 16/32 | (2009.01) | |
| H04W 84/04 | (2009.01) | |
| H04W 92/20 | (2009.01) | |

(52) U.S. Cl.
CPC ........... *H04W 36/04* (2013.01); *H04W 16/32* (2013.01); *H04W 24/02* (2013.01); *H04W 36/0005* (2013.01); *H04W 36/0055* (2013.01); *H04W 76/025* (2013.01); *H04W 84/045* (2013.01); *H04W 92/20* (2013.01)

(58) Field of Classification Search
CPC ......... H04W 36/0055; H04W 36/0022; H04W 36/04; H04W 84/045; H04W 16/32; H04W 36/0005; H04W 36/02; H04W 36/22; H04W 24/02; H04W 36/00
USPC ......... 455/436-444, 450-455; 370/252, 329, 370/331-333
See application file for complete search history.

(56) References Cited

U.S. PATENT DOCUMENTS

| | | | | |
|---|---|---|---|---|
| 2007/0254667 | A1* | 11/2007 | Jokinen | H04W 36/12 455/436 |
| 2014/0010204 | A1* | 1/2014 | Xu | H04W 36/0033 370/331 |
| 2014/0204771 | A1* | 7/2014 | Gao | H04W 36/28 370/252 |

OTHER PUBLICATIONS

3GPP TSG RAN2 Meeting #81, St. Julian's, Malta, Jan. 28-Feb. 1, 2013, R2-130267, "Fundamental considerations on dual connectivity", NEC, 5 pgs.

(Continued)

*Primary Examiner* — Allahyar Kasraian
(74) *Attorney, Agent, or Firm* — Harrington & Smith (57) ABSTRACT

There is provided a method, including requesting, by a network element of a macro cell network infrastructure, a local cell access point operating within the macro cell to either activate or deactivate a local cell control plane with respect to active user equipment of the local cell, wherein the local cell access point continues to provide a user plane to the active user equipment; and receiving a response to the request.

17 Claims, 4 Drawing Sheets

(56) References Cited

OTHER PUBLICATIONS

3GPP TSG-RAN WG2 Meeting #81, St. Julian's, Malta, Jan. 28-Feb. 1, 2013, R2-130292, "Discussion on dual connectivity for small cell" ASUSTeK, 3 pgs.
3GPP TSG-RAN WG3 Meeting #79, St. Julian's, Malta, Jan. 28-Feb. 1, 2013, R3-130138, "Consideration of the possible structures on the dual connectivity", NEC, 5 pgs.

* cited by examiner

200 REQUESTING A LOCAL CELL ACCESS POINT TO EITHER ACTIVATE OR DEACTIVATE A LOCAL CELL CONTROL PLANE WITH RESPECT TO ACTIVE USER EQUIPMENT OF THE LOCAL CELL, WHEREIN THE LOCAL CELL ACCESS POINT CONTINUES TO PROVIDE A USER PLANE TO THE ACTIVE USER EQUIPMENT

202 RECEIVING A RESPONSE TO THE REQUEST

300 RECEIVING A REQUEST FROM A NETWORK ELEMENT OF A MACRO CELL NETWORK INFRASTRUCTURE, WHEREIN THE REQUEST IS EITHER TO ACTIVATE OR DEACTIVATE A LOCAL CELL CONTROL PLANE WITH RESPECT TO ACTIVE USER EQUIPMENT OF THE LOCAL CELL

302 CONTINUE PROVIDING A USER PLANE TO THE ACTIVE USER EQUIPMENT

MOBILITY IN HETEROGENEOUS NETWORK ENVIRONMENTS

FIELD

The invention relates generally to mobile communication networks. More particularly, the invention relates to controlling the control plane of a local cell in a macro cell controlled environment.

BACKGROUND

It may be beneficial to have a local small cell, which is operating in a macro-controlled hot-spot environment, providing high-speed user plane communication capabilities to the active local cell users.

BRIEF DESCRIPTION OF THE INVENTION

According to an aspect of the invention, there are provided methods as specified in the claims.

According to an aspect of the invention, there are provided apparatuses as specified in the claims.

According to an aspect of the invention, there is provided a computer program product as specified in the claims.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The embodiments of the invention are applicable to a plurality of communication networks regardless of the applied radio access technology. For example, at least one of the following radio access technologies (RATs) may be applied: Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. The present embodiments are not, however, limited to these protocols. Typically the communication network comprises base stations, such as a node B (NB) or an evolved node B (eNB), capable of controlling radio communication and managing radio resources within the cell. Further, the eNB may establish a connection with a user equipment (UE) such as a mobile user terminal (UT) or any other apparatus capable of operating in a mobile communication network. For the sake of simplicity, let us in the following consider the RAT to be the LTE and the base station to be an eNB.

Figure 1:
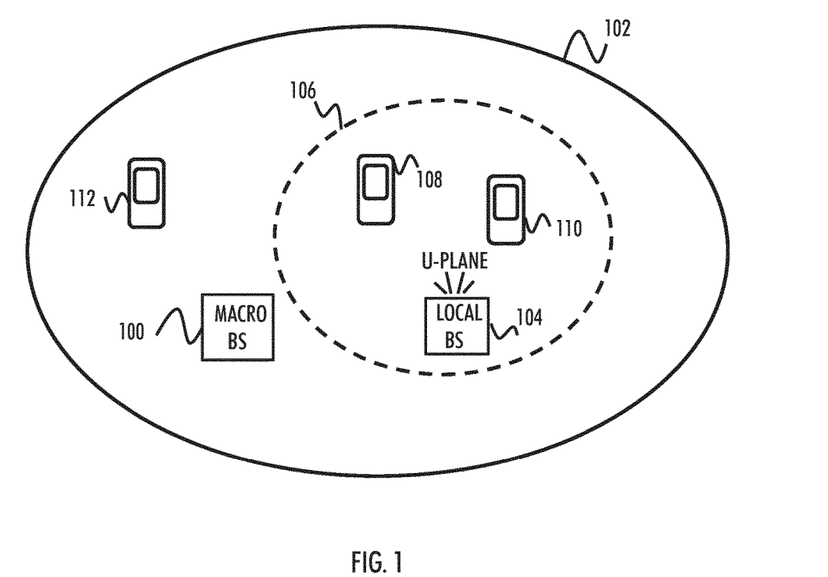
FIG. 1 presents a network, according to an embodiment.

In radio communication networks, such as in the network shown in FIG. 1, it is not rare that certain environments are left without optimal coverage or capacity. This may be the case even though being located within a coverage area (macro cell) 102 of a macro cell base station 100 or other wide area base station providing continuous coverage. These environments may include, for example, homes, offices, or hot-spot areas in which the demand for capacity is high. As a solution to provide improved coverage and capacity to these types of areas, another radio coverage area may be provided by a local cell 106 deployed for providing non-continuous coverage radio access. These types of local cells 106 typically have limited coverage area. Exemplary local or small cells 106 of this type include pico cells and possibly even micro cells deployed by an operator, as well as femto cells provided by a private base station, such as a Home Node B (HNB) or Home evolved Node B (HeNB), a private access point, a closed access base station, or any other local cell access point 104, for example. Further, any hotspot area within the macro cell may be seen as such local cell. The local cell/area access point (AP) 104 may differ from the wide area or macro cell base station (BS) 102 in that the transmit power applied is significantly lower in the local cell AP 104.

Let us consider such local cell operation in a macro-controlled hot-spot environment in which the local small cell 106 is used to provide high-speed optimized user plane (u-plane) to local users. That is, the local cell AP 104 may provide U-plane services to active UEs 108, 110 in the local cell 106. However, the user 112 may be served by the macro cell BS (e.g. eNB) 100, and not by the local cell AP 104. Further, the small cell 106 may be configured with or without a control plane (C-plane). In the latter case, the U-plane may nevertheless be provided by the small cell AP 104 but the C-plane is provided by the controlling or serving macro eNB 100. Consequently, the small cell 106 may not be seen as a regular cell by a local UE 108, 110. For this reason, the small cell 106 without C-plane may also be referred to as a phantom cell. It should be noted that in the LTE, for example, routing of the user data (also known as the U-plane) and the routing of the control signaling (also known as the C-plane) is separated.

Though the small cell 106 without C-plane (or the phantom cell concept) may simplify local off-loading, it may be as such rather limiting. Thus, it may be beneficial that the small cell 106 is able to operate as a regular, stand-alone cell with C-plane services, whenever that is necessary. For instance, when there are too many users in the macro cell 102 and the load with respect to the controlling macro cell eNB 100 is too high, it may be advantageous to offload and distribute also at least some C-plane services to a local small cell 106. In this case, some of the small cells 106 without C-plane may need to be reconfigured to operate as a fully functioning local cell 106 and to provide also C-plane to the relevant group of local users 108, 110. However, when local cell C-plane coverage is not needed, it may be beneficial to switch the local cell C-plane off and provide the C-plane by the macro cell eNB 100. Thus, there is a need for a simple and efficient macro-controlled C-plane reactivation/deactivation of the local cell 106 on-the-fly in such macro-controlled hot-spot environment for an efficient overload control of the macro cell 102 and, more generally, load balancing purposes.

Figure 2:
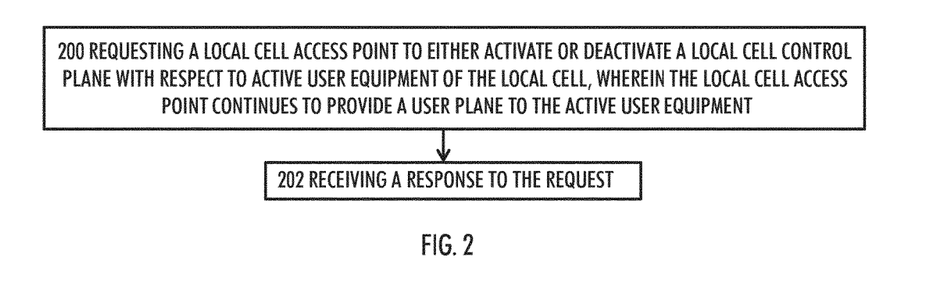
FIGS. 2, 3 and 7 present methods according to some embodiments.
Figure 3:
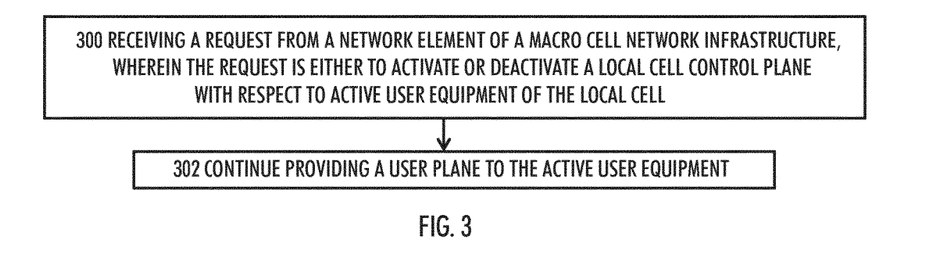

Therefore, it is proposed to enable the C-plane reactivation and/or deactivation of the local small cell 106 on-the-fly (real-time) in a macro-controlled environment, wherein the local cell 106 comprises a group of local active user terminal/equipment (UT/UE) 108, 110 to which the local cell AP 104 provides U-plane services. The C-plane reactivation and/or deactivation may cause the local UEs 108, 110 to relocate/handover their C-plane connection between the macro cell 102 and the local cell 106, as will be described. Such macro-controlled C-plane reactivation and/or deactivation may be enabled, as shown in FIGS. 2 and 3, by causing, in step 200, the macro cell eNB 100 to request the local cell AP 104 operating within the macro cell 102 to either activate or deactivate a local cell C-plane with respect to the active UEs 108, 110 of the local cell 106. The request may be due to the C-plane overload at the macro cell 106, for example. The request may be indicated to the local cell AP 104 via the X2/S1, or via any other relevant interface. In the description the term "local cell C-plane" denotes a C-plane provided by the local cell AP 104, whereas "macro cell C-plane" denotes a C-plane provided by the macro cell eNB 100.

However, as indicated earlier, the U-plane for the active UEs 108, 110 is provided before the request by the local cell AP 104. According to the proposal, the local cell AP 104 continues to provide the U-plane to the active user equipment 108, 110 even after the request and after the C-plane provider is switched. That is, in an embodiment, the U-plane for all the affected local active UEs 108, 110 is provided by the local cell regardless of whether C-plane is over the macro cell 102 or the local cell 106.

The macro cell eNB 100 may place the request to the local cell AP 104. However, in another embodiment, the request is placed by any other network element of a macro cell network infrastructure. Such element may be any relevant controlling server or supporting node, or an element of the core network. However, for simplicity reasons let us assume in the description that the network element is the macro cell eNB 100.

In an embodiment, the request may be a short message without any information about the contexts of the affected UEs 108, 110. This may be because extensive information about all relevant or affected active UEs 108, 110 (e.g. the UE contexts including the required services of the UEs 108, 110) may already be available at the local small cell 106 which is currently providing U-plane services for those UEs 108, 110. In another embodiment, however, predetermined information about the affected UEs 108, 110 (e.g. the UE context) and/or C-plane configuration thereof may be indicated in the request message. The indication of such additional information may be indicated to the local cell AP 104 individually or commonly, and explicitly or implicitly.

In step 202, the macro cell eNB 100 receives a response to the request. In an embodiment, the response may be an indication that the local cell C-plane has been successfully established and activated. In an embodiment, the response may carry an indication to release the corresponding C-plane resources. After such message, the macro cell may release its own C-plane towards the relevant UEs 108, 110. As may be appreciated by the skilled person, such released resources may then be used for some other UEs, such as for the UE 112. In another embodiment, the response may indicate that the local cell C-plane activation by the local cell 106 is not successful or that at least one of the relevant UEs 108, 110 was not successful in setting up the new C-plane. In such case, it may be that the individual at least one UE 108, 110 may have to initiate a radio link failure (RLF) process with the macro cell 102 while maintaining the U-plane with the local small cell 106. In yet another embodiment, the response may indicate that the deactivation of the local cell C-plane has been performed. The response may be received from the local cell AP 104 or from at least one of the relevant UE 108, 110, as will be described later.

From the point of view of the local cell AP 104 operating within a coverage area of a macro cell 102, the proposal may comprise, as shown in FIG. 3, receiving a request from the network element of a macro cell network infrastructure (e.g. the macro cell eNB 100) in step 300. The request, as said, is to perform either an activation or deactivation of a local cell control plane with respect to active user equipment of the local cell 106. In step 302, the local cell AP 104 continues to provide the user plane to the active UEs 108, 110 of the local cell 106, as explained. Thus, the U-plane is served by the local cell AP 104 without interruptions.

In an embodiment, the wide-area macro cell 102 operates in a frequency division duplex mode (FDD) and the local cell 106 operates in a time division duplex mode (TDD). The UEs 108, 110 of the small cell 106 may thus be aware of currently active local mode and connection to the U-plane. In an embodiment, the C-plane signaling radio bearer (SRB) services and configurations are substantially similar across all the relevant active UEs 108, 110 in the local cell 106. In an embodiment, cellular radio network temporary identifier (C-RNTI) is unique over the coverage area of the macro cell 106 regardless of whether the serving cell is the macro cell 102 or the local cell 106. Further, in an embodiment, the controlling macro cell 102 may maintain the UE contexts of all active UEs over the macro-controlled coverage area 102. That is even if the UEs 108, 110 are served by the local cell 106 (U-plane and possibly also the C-plane), the macro cell eNB 100 may be aware of the UE contexts (both C-plane and U-plane contexts) of all the UEs 108, 110, 112 in its coverage area 102. However, the local cell AP 104 may be aware of only the U-plane contexts in case where the local cell AP 104 does not currently provide the C-plane (phantom cell).

Figure 4:
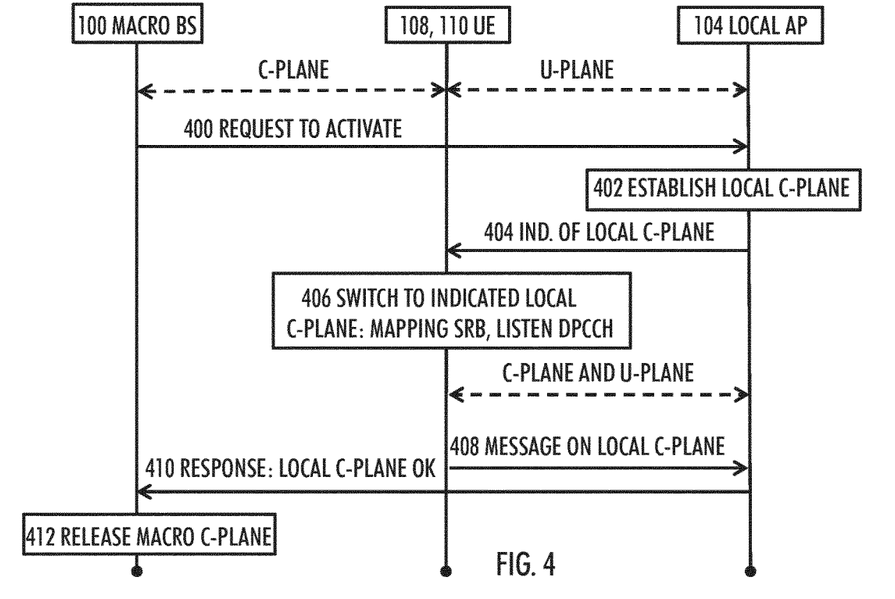
FIGS. 4 to 6 show signaling flow diagrams according to some embodiments.
Figure 5:
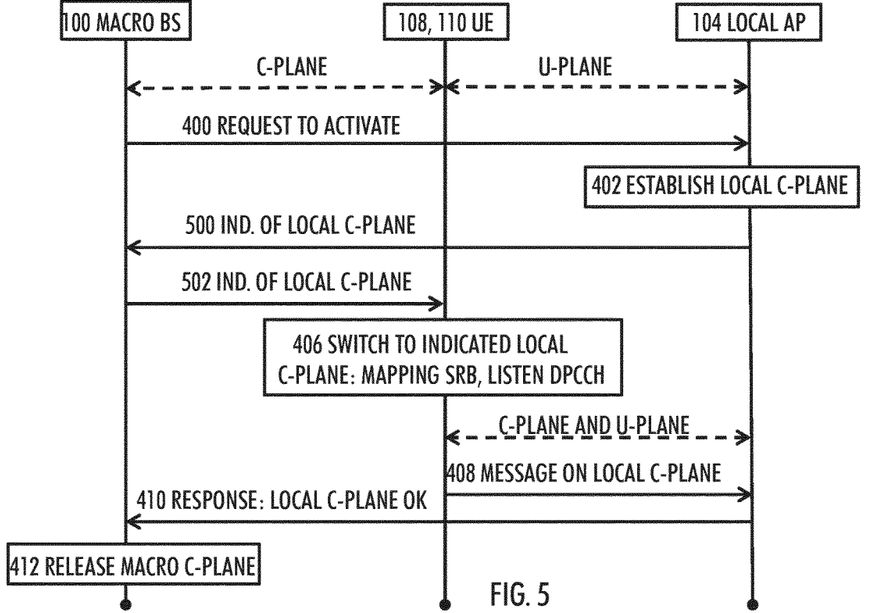
Figure 6:
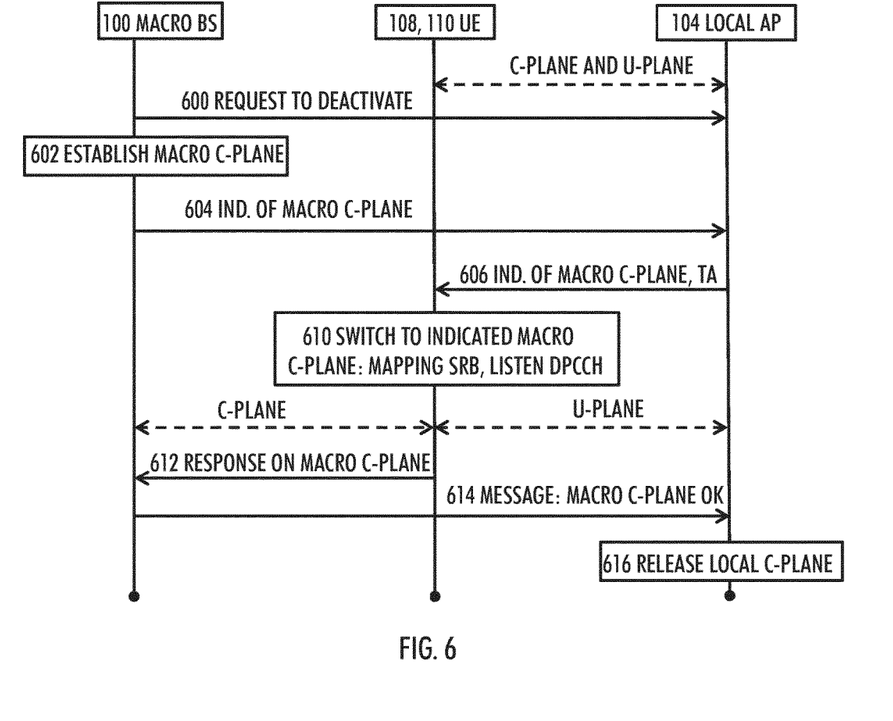

Let us look at the proposal in more depth with reference to FIGS. 4, 5 and 6. FIG. 4 shows an embodiment for an activation request of the local cell C-plane. Accordingly, as shown in FIG. 4 with the dotted arrows, the initial situation such that the macro cell 102 (e.g. the macro cell eNB 100) provides the macro cell control plane to the active UEs 108, 110 before the request is sent and the request is thus for activation of the local cell C-plane. The method then starts in step 400 by the macro cell eNB 100 transmitting the request to the local cell AP 104 via the X2 interface, for example.

In step 402, the local cell AP 104 then establishes the local cell control plane for the active UEs 108, 110. The establishing may comprise activating or re-activating the local cell C-plane for the UEs 108, 110. As said, the UE contexts of the UEs 108, 110 may already be known by the local cell AP 104 or the macro cell eNB 100 may indicate the required contexts. It should be noted that the local cell AP 104 may have previously provided the C-plane to the UEs 108, 110 so the local cell AP 104 may know the required contexts from this reason as well. The establishing of the local cell C-plane may comprise generating the local cell C-plane configuration including the signaling radio bearers (SRBs) used for the upcoming local cell C-plane services/communication, for example.

In step 404, the local cell AP 104 may indicate the configuration of the established local cell C-plane to the active UEs 108, 110 via the existing U-plane, which is currently provided by the local cell AP 104. This may be advantageous so that the macro cell control plane need not be used for the signaling. The indication of the new serving cell via the U-plane connection may take place, e.g., by using designated layer 1 (L1) signaling, such as uplink scheduling over a physical downlink control channel (PD-CCH) extended with the C-plane relocation indication, by using layer 2 (L2) control packet data units (C-PDU), such as a packet data convergence protocol C-PDUs, radio link control C-PDUs, or a medium access control C-PDUs, or by using a dummy packet pattern. In an embodiment, in addition to or instead of this indication over the individual U-plane connection, the small cell AP 104 may apply broadcast and/or multicast control in step 404 to indicate all the affected UEs 108, 110 substantially simultaneously about the local cell C-plane reactivation. The broadcasted message may be an update of the system information in the local small cell 106 or a U-plane message targeted to all relevant UEs 108, 110.

The indication transmitted in step 404 may also comprise a command to the active UEs 108, 110 to switch to using the established local cell C-plane. In other words to command the UEs 108, 110 to relocate or handover their C-plane control from the macro cell 102 to the local cell 106. It should be noted that the request is only for the C-plane relocation, not for the U-plane provided by the local cell AP 104.

In step 406, the relevant UEs 108, 110 having the U-plane connection to the local cell AP 104 may receive a command to switch the currently active macro cell C-plane to the indicted local cell C-plane. Then, the UE 108, 110 may switch to the indicated local cell C-plane while keeping the U-plane connection to the local cell AP 104. The UE 108, 110 may acknowledge the local cell C-plane and take it into use by mapping the SRBs of the local cell 106 to the corresponding transport and physical channels of the local cell 106 instead of those of the macro cell 102. As said, the UE 108, 110 may acquire the local cell C-plane configuration in step 404. Further, the UEs 108, 110 may listen to the DPCCH of the local cell 106. As a result of the switching, the active C-plane of the UEs 108, 110 is the one corresponding to the local cell 106, as shown with the dotted arrow in FIG. 4.

Thereafter, the UE 108, 110 may, in step 408, respond to the local cell AP 104 by indicating in a message that the established local cell C-plane is ready to be used. In an embodiment, the response is a C-plane message, such as a radio resource control (RRC) message to the local cell AP 104 in order to complete the relocation of the active C-plane to the local small cell 106. In another embodiment, the UE 108, 110 reply by using the existing U-plane connection to the local cell AP 104.

Further, in step 410, the local cell AP 104 may transmit and the macro cell eNB 100 may receive the response indicating that the local cell AP 104 has established the local cell C-plane and that the established local cell C-plane is active. The response may further carry an indication to the macro cell eNB 100 to release the macro cell C-plane with respect to the active UEs 108, 110. Thereafter, in step 412 after detecting that the established local cell C-plane is active, the macro cell eNB 100 may release the macro cell C-plane with respect to the active UEs 108, 110. This may be advantageous as then the released control plane resources may be used for other purposes. E.g., the released resources may be applied in providing communication services to the UEs served by the macro cell 102, such as to the UE 112.

The proposed solution for the local C-plane (re)activation on-the-fly affects only the group of UEs 108, 110 located in the small cell 106. Furthermore, the embodiment of FIG. 4 avoids using the dedicated control signaling of the controlling or serving eNB 100 as much as possible. Thus the proposed method minimizes any further load to the macro cell C-plane which may already be congested (overloaded) and in need of reducing the C-plane load. The target may be to keep the required macro cell C-plane radio signaling overhead as low as possible. As indicated in FIG. 4, this may be achieved by not having to use any dedicated control signaling for relocating the affected UEs 108, 110 by the macro cell eNB 100. Instead, the UE control may be handled locally by the local cell AP 104 by utilizing the existing U-plane connection (e.g. control messages sent in form of L2 C-PDUs or L1 signaling over the air). It should be noted that the affected UEs 108, 110 may not see a fully functioning local small cell 106 beforehand (e.g. they see only a phantom cell) so the operation of the local cell C-plane reactivation is different from a regular handover in which both of the source and target cells are fully functioning cells beforehand.

FIG. 5 shows another embodiment for requesting the (re)activation of the local cell C-plane. Accordingly, as shown in FIG. 5 with the dotted arrows, the initial situation such that the macro cell 102 (e.g. the macro cell eNB 100) provides the macro cell control plane to the active UEs 108, 110 before the request is sent. Steps 400 and 402 of FIG. 5 may thus correspond to the corresponding steps in FIG. 4.

However, instead of transmitting an indication of the established local cell C-plane (e.g. the configuration) to the UEs 108, 110 via the local cell U-plane signaling, the local cell AP 104 may in step 500 indicate the configuration of the established local cell C-plane to the macro cell eNB 100, e.g. via the X2 interface, in order to enable the macro cell eNB 100 to inform the active UE 108, 110 about the configuration. The acknowledgement message transferred in step 500 may carry the configuration of the established local cell C-plane. After, receiving the indication from the local cell AP 104 in step 500, the macro cell eNB 100 may, in step 502, transmit (forward) an indication of the configuration to the active UEs 108, 110 via the existing macro cell C-plane. In an embodiment, the indication may also carry a command to the active UE 108, 110 to switch to using the established local cell C-plane. The indication may be broadcasted/ multicasted as a control message to the relevant group of individual UEs 108, 110 to trigger a C-plane handover or a C-plane relocation.

In an embodiment, the macro cell eNB 100 may have allocated an identifier to the local cell AP 104. As a result, each local cell 106 may have one radio network temporary identifier (RNTI) allocated by the controlling macro eNB 100. Further, the UEs 108, 110 that are served in the U-plane by the local cell 106 may be aware of the RNTI of the local cell 106. The UEs 108, 110 may e.g. monitor what the RNTI of the local cell 106 is. Consequently, the macro cell eNB 100 may apply the allocated identifier in identifying the target active UE 108, 110 to which the indication of the configuration is sent. As an example, the transmitted command/indication may be identified with the RNTI specific to the local cell 106. The UEs 108, 110 may detect the RNTI indicated in the indication of step 502 and if the RNTI corresponds to the one specific to the serving local cell 106, then the UEs 106, 108 listen to the indication. In this way the indication is substantially simultaneously broadcasted/multicasted to the relevant group of individual UEs 108, 110. This may be advantageous as then no individual/dedicated control plane signaling is needed which may reduce the use of the already overloaded macro cell C-plane.

As a result, the UEs 108, 110 may receive the command to switch the currently active macro cell C-plane to the local cell C-plane. Thereafter, as described earlier with respect to step 406, the UEs 108, 110 may switch to the local cell C-plane while keeping the U-plane connection to the local cell AP 104. This may include that the individual affected UEs 108, 110 map SRBs to the corresponding transport and physical channels of the local small cell 106, listen to broadcast system information update and DPCCH of the local small cell 106, etc.

In step 408, the UEs 108, 110 respond to the received indication with a C-plane message (e.g. RRC) to the local cell 106 to complete the relocation of the C-plane to the local cell 106. The message may indicate that the established local cell C-plane is ready to be used. Thereafter, the local cell AP 104 may perform communication on the established local cell C-plane with the at least one of the active UEs 108, 110.

In step 410, the local cell AP 104 may transmit a response to the macro cell eNB 100 to indicate that the established local cell C-plane is active. Further, the response may carry an indication to the network element 100 to release the macro cell C-plane with respect to the active UE 108, 110. Thus, the macro cell eNB 100 may, in step 412 after detecting that the established local cell C-plane is active for the UEs 108 and 110, release the macro cell C-plane with respect to the UEs 108, 110.

FIG. 6 shows an embodiment for requesting a deactivation of the currently active local cell C-plane. Accordingly, as shown in FIG. 6 with the dotted arrows, the initial situation such that the local cell 106 (e.g. the local cell AP 104) provides the local cell control plane to the active UEs 108, 110 before the deactivation request is sent. In addition, the U-plane is served by the local cell AP 104 to the UEs 108, 110.

In step 600, the macro cell eNB 100 transmits the request for the deactivation of the local cell C-plane to the local cell AP 104 via the X2/S1 interface, for example. The request may also carry an indication to hand the C-plane control of the affected UEs 108, 110 (i.e. those UEs which are now served by the local cell C-plane) over to the macro cell 102.

In step 602, the macro cell eNB 100 may establish the macro cell C-plane for the active UEs 108, 110. The establishment may comprise setting up or reactivating the macro cell C-plane configuration including the UE contexts and SRBs for all the relevant UEs 108, 110. In an embodiment, the macro eNB 100 has already knowledge about the contexts of active UEs 108 and 110. In an embodiment, prior to this step 602, the local AP 104, in response to the step 600, may update the UE context information comprised in the requesting eNB 100 so that the step 602 can be carried out more precisely. This may take place by the local cell AP 104 sending an X2/S1 indication about the UEs' contexts to the macro cell eNB 100.

In step 604, the macro cell eNB 100 indicates the configuration of the established macro cell C-plane to the local cell AP 104 in order to enable the local cell AP 104 to inform the active UEs 108, 110 about the configuration. This indication from the macro cell eNB 100 to the local cell AP 104 may take place via the X2 interface, for example. Then, the local cell AP 104 may forward the indication of the configuration to the active UEs 108, 110 in step 606. In an embodiment, this indication takes place on the currently active local cell C-plane. In another embodiment, this indication takes place on the currently active local cell U-plane. The indication may comprise using e.g. a common control message broadcasted to all the affected UEs 108, 110, or dedicated control signaling or via U-plane using L2 C-PDU or L1 signaling.

In an embodiment, the local cell AP 104 may further transmit a command to the active UEs 108, 110 to switch to using the established macro cell C-plane. Yet in one embodiment, the local cell AP 104 may transmit an indication of a timing advance with respect to the macro cell 106 to the active UEs 108, 110. Here it may be assumed that the local cell UEs 108, 110 are relatively close to each other so that the initial timing advance may be the same for all UEs 108, 110 in the local cell 106. The initial timing advance information may be available and updated at the local small cell AP 104. For this, the macro cell eNB 100 may determine the timing advance of the active UE 108, 110 and indicate the determined timing advance to the local cell AP 104.

As a result, in step 610, the relevant UEs 108, 110 may switch to the indicated macro cell C-plane while keeping the U-plane connection to the local cell AP 104. The switch may comprise mapping the indicated SRBs to the corresponding transport and physical channels of the macro cell 102, listening to broadcast system information update and DPCCH of the macro cell 102, for example. Thereafter, as shown in FIG. 6 with the dotted arrows, the C-plane to the macro cell 102 may be active and used while the U-plane connection remains to the local cell AP 104.

In step 612, the UE 108, 110 may respond with a macro cell C-plane message (e.g. RRC) to the macro cell eNB 100 to complete the relocation of the C-plane to the macro cell eNB 100. The respond may indicate that the established macro cell C-plane is ready to be used. Thereafter, the macro cell eNB 100 may perform communication on the established macro cell C-plane with the at least one of the active UEs 108, 110.

Figure 7:
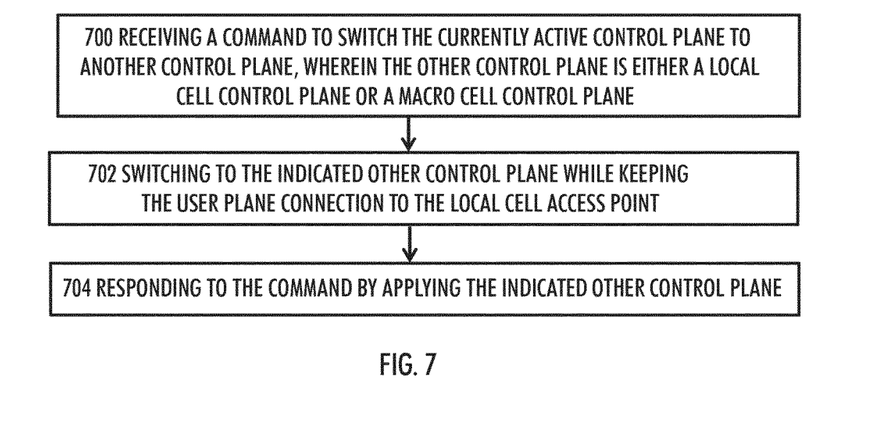

Finally, in step 614, the macro cell eNB 100 may transmit a message to the local cell AP 104 indicating that the established macro cell C-plane is active and that the local cell C-plane with respect to the active UE 108, 110 may be released. In this way the local cell AP 104 may detect that the established macro cell C-plane is already active. Then in step 616, the local cell AP 104 may release the local cell C-plane with respect to the active UE 108, 110 (i.e. turn into a phantom cell). For the local cell C-plane deactivation, the target may be to perform the deactivation and switch to the macro cell C-plane simple and fast. From the point of view of the UE 108, 110 having user plane connection to the local cell AP 104 operating within the coverage area of the macro cell 102, the method is illustrated in FIG. 7. The method starts in step 700 by the UE 108, 110 receiving a command to switch the currently active C-plane to another C-plane, wherein the other C-plane is either a local cell C-plane or a macro cell C-plane. The command may carry information related to the established configuration of the to-be-applied C-plane including the SRBs, for example.

In an embodiment, wherein the currently active C-plane is the macro cell C-plane and the command is for switching to the local cell C-plane, the UE 108, 110 may receive the command from the local cell AP 104 via the currently active U-plane.

In an embodiment, wherein the currently active C-plane is the macro cell C-plane and the command is for switching to the local cell C-plane, the UE 108, 110 may receive the command from the network element 100 of a macro cell network infrastructure via the currently active macro cell C-plane.

In yet another embodiment, wherein the currently active C-plane is the local cell C-plane and the command is for switching to the macro cell C-plane, the UE 108, 110 may receive the command from the local cell AP 104 via a local cell U-plane or via a local cell C-plane. Thereafter, in step 702, the UE 108, 110 may switch to the indicated other C-plane while keeping the user plane connection to the local cell AP 104. This step may comprise mapping the SRBs, as explained above. It should be noted that the command to switch to the other control plane (that is, to handover or relocate the C-plane) does not cause any changes to the user plane currently applied. The request for the relocation is only for the control plane, not for the user plane.

Then in step 704, the UE 108, 110 may respond to the command by applying the indicated other C-plane. Therefore, the response is made in the recently established C-plane (e.g. RRC message) either to the local cell AP 104 or to the macro cell eNB 100, as the case may be.

Figure 8:
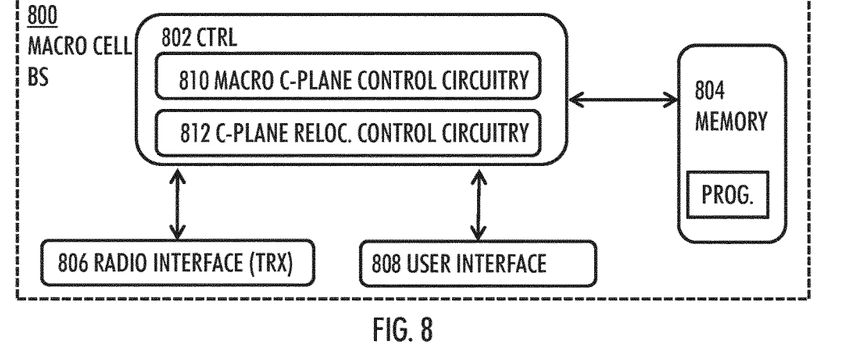
FIGS. 8 to 10 illustrate apparatuses according to some embodiments.
Figure 9:
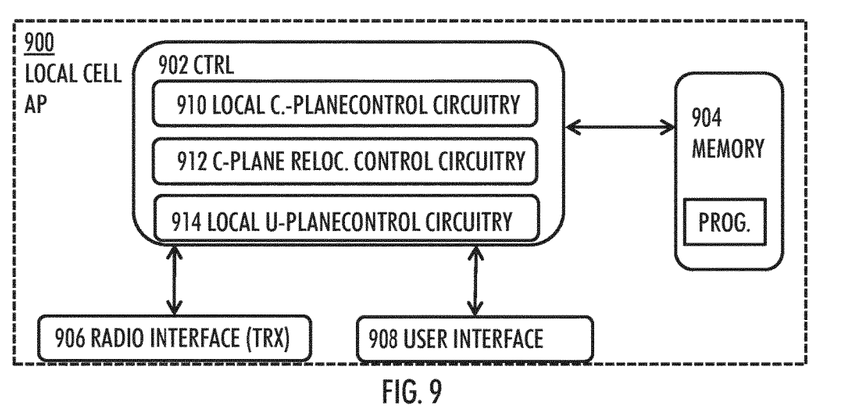
Figure 10:
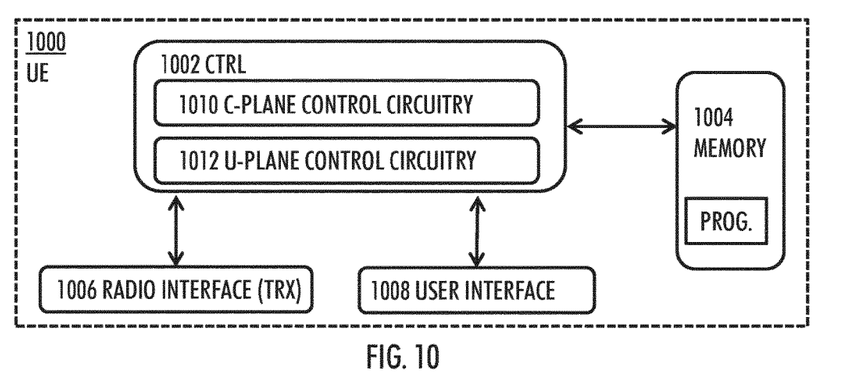

FIGS. 8 to 10 provide apparatuses 1000, 1100, and 1200 comprising a control circuitry (CTRL) 802, 902, 1002, such as at least one processor, and at least one memory 804, 904, 1004 including a computer pro-gram code (PROG), wherein the at least one memory and the computer pro-gram code (PROG), are configured, with the at least one processor, to cause the respective apparatus 800, 900, 1000 to carry out any one of the embodiments described. The memory 804, 904, 1004 may be implemented using any suitable data storage technology, such as semiconductor based memory devices, flash memory, magnetic memory devices and systems, optical memory devices and systems, fixed memory and removable memory.

The apparatuses 800, 900, 1000 may further comprise communication interfaces (TRX) 806, 906, 1006 comprising hardware and/or software for realizing communication connectivity according to one or more communication protocols. The TRX may provide the apparatus with communication capabilities to access the radio access network, for example.

The apparatuses 800, 900, 1000 may also comprise user inter-faces 808, 908, 1008 comprising, for example, at least one keypad, a micro-phone, a touch display, a display, a speaker, etc. Each user interface may be used to control the respective apparatus by the user.

In an embodiment, the apparatus 800 may be or be comprised in a base station (also called a base transceiver station, a Node B, a radio network controller, or an evolved Node B, for example). In an embodiment, the apparatus 800 is or is comprised in the network element 100 of the macro cell network infrastructure, such as in the macro cell eNB 100.

The control circuitry 802 may comprise a macro cell C-plane control circuitry 810 for managing the macro cell C-plane, such as for determining the UE contexts and the SRBs for the macro cell C-plane configuration. The control circuitry 802 may further comprise a C-plane relocation control circuitry 812 for performing functionalities related to the C-plane relocation, whether from the macro cell C-plane to the local cell C-plane, or vice versa. These may include transmission of activation, deactivation and relocation requests, for example.

In an embodiment, the apparatus 900 may be or be comprised in a local cell access point, such as a femto cell base station, a private base station, a hot-spot access point. In an embodiment, the apparatus 900 is or is comprised in the local cell access point 104. The control circuitry 902 may comprise a local cell C-plane control circuitry 910 for managing the local cell C-plane, such as for determining the UE contexts and the SRBs for the local cell C-plane configuration. The control circuitry 902 may further comprise a C-plane relocation control circuitry 912 for performing functionalities related to the C-plane relocation, whether from the macro cell C-plane to the local cell C-plane, or vice versa. These may include transmission of relocation requests to the UEs, and transmitting responses to activation/deactivation requests, for example. Further, the control circuitry 902 may comprise a local cell U-plane control circuitry 914 for managing the functionalities related to the user plane services to the active users of the local cell.

In an embodiment, the apparatus 1000 may comprise the terminal device of a cellular communication system, e.g. a user equipment (UE), a user terminal (UT), a computer (PC), a laptop, a tabloid computer, a cellular phone, a mobile phone, a communicator, a smart phone, a palm computer, or any other communication apparatus. Alternatively, the apparatus 1000 is comprised in such a terminal device. Further, the apparatus 1000 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 1000 may be, comprise or be comprised in a mobile phone, such as the UE 108 or 110, operating according to the long term evolution or according to the long term evolution advanced.

The control circuitry 1002 may comprise a C-plane control circuitry 1010 for handling functionalities related to the control plane services, such as control signalling. The C-plane control circuitry 1010 may perform functionalities related to the switch/handover/relocation of the active C-plane. The control circuitry 1002 may further comprise a U-plane control circuitry 1012 for handling functionalities related to the user plane services, such as user data transmission.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art. Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
    at least one processor and at least one memory including a computer program code, wherein the at least one memory and the computer program code are configured, with the at least one processor, to cause the apparatus at least to:
    request a local cell access point operating within a macro cell to activate a local cell control plane with respect to active user equipment of the local cell, wherein the local cell access point continues to provide a user plane to the active user equipment and the macro cell provides a macro cell control plane to the active user equipment before the request;
        cause a reception of a response from the local cell access point indicating that the local cell access point has established the local cell control plane, wherein the response carries a configuration of the established local cell control plane;
        cause a transmission of an indication of the configuration to the active user equipment via the existing macro cell control plane;
        detect that the established local cell control plane is active; and
        release the macro cell control plane with respect to the active user equipment.

2. The apparatus of claim 1, wherein the macro cell provides a macro cell control plane to the active user equipment before the request and the request is for activation of the local cell control plane, and wherein the at least one memory and the computer program code are configured, with the at least one processor, to cause the apparatus further to: cause the reception of the response from the local cell access point indicating that the local cell access point has established the local cell control plane and that the established local cell control plane is active; and
    release the macro cell control plane with respect to the active user equipment.

3. The apparatus of claim 1, wherein the at least one memory and the computer program code are configured, with the at least one processor, to cause the apparatus further to:
    allocate an identifier to the local cell access point; and
    apply the allocated identifier in identifying the target active user equipment to which the indication of the configuration is sent.

4. The apparatus of claim 1, wherein the at least one memory and the computer program code are configured, with the at least one processor, to cause the apparatus further to:
    cause a transmission of a command to the active user equipment to switch to using the established local cell control plane.

5. The apparatus of claim 1, wherein the apparatus is or is comprised in a macro cell base station.

6. The apparatus of claim 1, wherein the request to activate or deactivate the local cell control plane depends on a network communication load of the macro cell.

7. The apparatus of claim 1, wherein the request to activate or deactivate is transmitted to the local cell control plane via an X2/S1 communication interface.

8. The apparatus of claim 1, wherein the user plane provided to the active user equipment is provided prior to the request.

9. The apparatus of claim 1, wherein the request is transmitted without information about the contexts of the active user equipment.

10. The apparatus of claim 1, wherein the request is transmitted with at least one of predetermined information about the active user equipment, information about the contexts of the active user equipment and information about the control plane configuration.

11. An apparatus, comprising:
    at least one processor and at least one memory including a computer program code, wherein the at least one memory and the computer program code are configured, with the at least one processor, to cause the apparatus at least to:

request a local cell access point operating within a macro cell to deactivate a local cell control plane with respect to active user equipment of the local cell, wherein the local cell access point continues to provide a user plane to the active user equipment and the local cell access point provides local cell control plane to the active user equipment before the request;

establish a macro cell control plane for the active user equipment;

indicate a configuration of the established macro cell control plane to the local cell access point in order to enable the local cell access point to inform the active user equipment about the configuration;

cause the reception of the response from at least one of the active user equipment via the established macro cell control plane, wherein the response indicates that the established macro cell control plane is ready to be used; and cause a transmission of a message to the local cell access point, wherein the message indicates that the established macro cell control plane is active.

12. A method, comprising:

requesting a local cell access point operating within a macro cell to activate a local cell control plane with respect to active user equipment of the local cell, wherein the local cell access point continues to provide a user plane to the active user equipment and the macro cell provides a macro cell control plane to the active user equipment before the request;

causing a reception of a response from the local cell access point indicating that the local cell access point has established the local cell control plane, wherein the response carries a configuration of the established local cell control plane;

causing a transmission of an indication of the configuration to the active user equipment via the existing macro cell control plane;

detecting that the established local cell control plane is active; and releasing the macro cell control plane with respect to the active user equipment.

13. The method of claim 12, wherein the macro cell provides a macro cell control plane to the active user equipment before the request and the request is for activation of the local cell control plane, and further comprising:

causing the reception of the response from the local cell access point indicating that the local cell access point has established the local cell control plane and that the established local cell control plane is active; and releasing the macro cell control plane with respect to the active user equipment.

14. The method of claim 12, further comprising:

allocating an identifier to the local cell access point; and applying the allocated identifier in identifying the target active user equipment to which the indication of the configuration is sent.

15. The method of claim 12, further comprising:

causing a transmission of a command to the active user equipment to switch to using the established local cell control plane.

16. The method of claim 12, wherein the local cell access point provides the local cell control plane to the active user equipment before the request and the request is for deactivation of the local cell control plane, and further comprising:

establishing a macro cell control plane for the active user equipment;

indicating a configuration of the established macro cell control plane to the local cell access point in order to enable the local cell access point to inform the active user equipment about the configuration;

causing the reception of the response from at least one of the active user equipment via the established macro cell control plane, wherein the response indicates that the established macro cell control plane is ready to be used; and causing a transmission of a message to the local cell access point, wherein the message indicates that the established macro cell control plane is active.

17. The method of claim 12, wherein the request is sent by an apparatus that is or is comprised in a macro cell base station.

* * * * *